(12) United States Patent
Avakian et al.

(10) Patent No.: US 7,902,283 B2
(45) Date of Patent: Mar. 8, 2011

(54) POLYAMIDE COMPOUNDS CONTAINING ZINC SULFIDE

(75) Inventors: Roger W. Avakian, Aurora, OH (US); Grant Barber, Avon Lake, OH (US); David A. Jarus, Shaker Hts., OH (US)

(73) Assignee: PolyOne Corporation, Avon Lake, OH (US)

( * ) Notice: Subject to any disclaimer, the term of this patent is extended or adjusted under 35 U.S.C. 154(b) by 847 days.

(21) Appl. No.: 11/765,766

(22) Filed: Jun. 20, 2007

(65) Prior Publication Data

US 2007/0295942 A1 Dec. 27, 2007

Related U.S. Application Data

(60) Provisional application No. 60/805,239, filed on Jun. 20, 2006.

(51) Int. Cl.
*C03C 17/34* (2006.01)
(52) U.S. Cl. .......................................................... 524/420
(58) Field of Classification Search .................... 524/420
See application file for complete search history.

(56) References Cited

U.S. PATENT DOCUMENTS

| | | | |
|---|---|---|---|
| 4,847,135 A | 7/1989 | Braus et al. | |
| 5,124,391 A * | 6/1992 | Muehlbach et al. | 524/420 |
| 5,373,026 A | 12/1994 | Bartz et al. | |
| 5,410,135 A | 4/1995 | Pollart et al. | |
| 5,478,878 A * | 12/1995 | Nagaoka et al. | 524/430 |
| 5,795,695 A | 8/1998 | Malhotra et al. | |
| 5,795,696 A | 8/1998 | Malhotra | |
| 5,918,099 A | 6/1999 | Schuelter et al. | |
| 6,048,919 A | 4/2000 | McCullough | |
| 6,444,323 B1 | 9/2002 | Matsumoto et al. | |
| 6,479,572 B1 | 11/2002 | Weber et al. | |
| 6,528,572 B1 | 3/2003 | Patel et al. | |
| 6,685,855 B1 | 2/2004 | Miller et al. | |
| 6,740,373 B1 | 5/2004 | Swoboda et al. | |
| 6,878,781 B2 | 4/2005 | Zarnoch et al. | |
| 6,949,289 B1 | 9/2005 | Lawton et al. | |
| 7,077,990 B2 | 7/2006 | Miller | |
| 2002/0058743 A1 | 5/2002 | Tobita et al. | |
| 2003/0139510 A1 | 7/2003 | Sagal et al. | |
| 2003/0236335 A1 | 12/2003 | Miller et al. | |
| 2004/0087697 A1 | 5/2004 | Tobita et al. | |
| 2004/0126521 A1 | 7/2004 | Extrand | |
| 2004/0126522 A1 | 7/2004 | Extrand et al. | |
| 2005/0189522 A1 | 9/2005 | Sagal et al. | |
| 2005/0189523 A1 | 9/2005 | Sagal et al. | |
| 2005/0233206 A1 | 10/2005 | Puttaiah et al. | |
| 2005/0272845 A1 | 12/2005 | Miller | |
| 2006/0004126 A1 | 1/2006 | Park et al. | |

FOREIGN PATENT DOCUMENTS

| | | |
|---|---|---|
| KR | 20050022366 A | 3/2005 |
| WO | 2007149783 A1 | 12/2007 |
| WO | 2008063709 A2 | 5/2008 |

OTHER PUBLICATIONS

KIPO Abstract for KR20050022366, Mar. 7, 2005.

\* cited by examiner

*Primary Examiner* — Ling-Siu Choi
*Assistant Examiner* — Sonya Wright
(74) *Attorney, Agent, or Firm* — John H. Hornickel

(57) ABSTRACT

A thermally conductive polyamide compound is disclosed. The compound comprises a polyamide matrix and zinc sulfide dispersed in the matrix. Optionally, reinforcing filler or a second polymer or both is present. Optionally, thermal carbon black or the combination of thermal carbon black and colorant is present. The compound can be extruded or molded into a heat dissipating article.

15 Claims, No Drawings

POLYAMIDE COMPOUNDS CONTAINING ZINC SULFIDE

CLAIM OF PRIORITY

This application claims priority from U.S. Provisional Patent Application Ser. No. 60/805,239 bearing and filed on Jun. 20, 2006, which is incorporated by reference.

FIELD OF THE INVENTION

This invention concerns thermoplastic polymer compositions which are thermally conductive because of the presence of zinc sulfide.

BACKGROUND OF THE INVENTION

Any energized product in modern society is not ideally efficient. Therefore, the consumption of energy is accompanied by the emission of heat. Dissipation of heat from an energized product is a common industrial engineering consideration. Electronic products are particularly susceptible to excessive heat. Personal computers contain fans for keeping sensitive electronic parts at or near the ambient temperature by dissipating the heat by convection.

Thermally conductive polymer compounds also exist to dissipate heat by conduction. These compounds are formed into parts to serve as heat sinks, radiators, etc. and other items more traditionally made of metal. Often aluminum oxide, or more commonly called alumina, is used as an additive to a thermoplastic polymer matrix to serve as the vehicle for dissipation of heat. But alumina is a particularly abrasive material which can degrade the internal surfaces of manufacturing equipment such as compounding extruders.

SUMMARY OF THE INVENTION

Therefore, what the art needs is a thermally conductive additive, for a thermoplastic polymer matrix material, that is not abrasive.

The present invention has solved that problem by using zinc sulfide as the thermally conductive additive.

Zinc sulfide has a much lower Mohs hardness than alumina (3 vs. 9, respectively) with a comparable thermal conductivity (27 W/mK vs. 30 W/mK, respectively).

Thus, one aspect of the invention is a thermally conductive polymer compound, comprising a thermoplastic polymer matrix and zinc sulfide dispersed in the matrix.

Features of the invention will be explored below.

EMBODIMENTS OF THE INVENTION

Thermoplastic Polymer Matrix

Any conventional thermoplastic polymer is a candidate to serve as the matrix for the compound of the present invention. Without undue experimentation, one of ordinary skill in the art can select a matrix based on considerations of cost, manufacturing technique, physical properties, chemical properties, etc.

Non-limiting examples of suitable thermoplastic polymers are polyolefins, polyhalo-olefins, polyamides, polyesters, polyurethanes, polycarbonates, polyarylenes (sulfides, ethers, etc.), and mixtures thereof. The polymers can be homopolymers or copolymers of any structure.

Preferably, among these many candidates, polyphenylene sulfide is used because of its durability, high temperature tolerance, existence of suitable thermal conductivity, and heat distortion temperature. Polyphenylene sulfides are polymers containing a phenyl moiety and one or more sulfides bonded thereto. Those skilled in the art will recognize the variety of commercially available polyphenylene sulfides are suitable for use in the present invention. Non-limiting examples of such commercially available polyphenylene sulfides ("PPS") include Ryton brand PPS powders in various grades from Chevron Phillips Chemical Co. of The Woodlands, Tex. Any of the patents in the literature known to those skilled in the art are appropriate for determining a suitable choice, without undue experimentation.

Zinc Sulfide

Thermal conductivity of PPS is greatly enhanced in the present compound by the addition of zinc sulfide (ZnS).

ZnS can be structured in any form, such as powder, flake, fiber, and others. Powdered ZnS is preferred because of its ability to disperse into the polymer matrix. Powdered ZnS can have a particle size ranging from about 0.5 nm to about 100 micrometers, and preferably from about 5 micrometers to about 50 micrometers.

Optional Filler Reinforcement

Structural integrity of parts, made of compounds of the present invention, is enhanced by the use of reinforcing fillers. Preferably, those fillers are chemically inert and fibrous in shape.

Non-limiting examples of reinforcing fillers are silica, carbon black, glass fiber, carbon fiber, carbon nanotubes, aramid, mineral fiber, and the like. Preferably glass fiber is used because of its available and low cost compared to other types of fillers. If any electrical conductivity is desired in the compound, one can use carbon black, carbon fiber, or carbon nanotubes as the reinforcing filler. Without undue experimentation, one skilled in the art can formulate a thermally conductive and electrically conductive compound. An example of an electrically conductive PPS compound is disclosed in co-pending international patent application PCT/US2007/061,403, which is incorporated by reference herein.

Secondary Additive

As mentioned above with respect to reinforcement fillers, carbon black, carbon fibers, and carbon nanotubes can be added if one desires electrically conductivity.

However, this invention has unexpectedly found that the addition of a special secondary additive, thermal carbon black particles (also called "thermal black"), introduces two advantages to the compound of the present invention.

The first advantage is that thermal carbon black, depending on its concentration in the compound, can range from having the compound be essentially electrically insulative to static dissipative to semi-electrically conductive to electrically conductive.

The second advantage is the thermal carbon black is black on the grayscale while zinc sulfide is white on the grayscale, permitting the presence of both to contribute to coloration of the compound at any location in color space.

Thermal carbon black is one in a family of "pigment blacks", particularly in the Arosperse product line of Degussa, A. G. as sold as Arosperse 15 thermal black, CAS No 1333-86-4, the preferred secondary additive for this invention.

As explained in the IUPAC Gold Book, http://goldbook.iupac.org/T06296.html, thermal black is a special type of carbon black produced by pyrolysis of gaseous hydrocarbons in a preheated chamber in the absence of air. Thermal black consists of relatively large individual spheres (100-500 nm diameter) and aggregates of a small number of pseudospherical particles. The preferred alignment of the layer planes is parallel to the surface of the spheres.

The tailoring of electrical properties of the compound depends on the amount of thermal black present in the compound. Electrical properties are often characterized by surface resistivity. Generally, any amount of surface resistivity less than $10^{12}$ Ohms/square provides at least static dissipation. As one proceeds toward $10^9$ Ohms/square, one reaches a semi-conductive surface. If one reaches $10^5$ Ohms/square, an electrically conductive surface is achieved.

It has been found that as much as 30 weight percent of thermal black in the compound results in static dissipative properties, but upon increasing the weight percentage of thermal black to 40 or 60 weight percent, one can achieve a semi-conductive surface and an electrically conductive surface, respectively. It can be surmised that a weight percentage of 50 percent would at least provide semi-conductive properties and probably electrically conductive properties.

Optional Other Polymers

The compound of the present invention can include additional polymer resins to alter the morphology or rheology of the compound. The other polymers can be compatible with PPS in order to form blends or incompatible with PPS in order to form a continuous/discontinuous two-phase polymeric system.

Non-limiting examples of other optional polymers include polyolefins, polyamides, polyesters, polyhalo-olefins, and polyurethanes. Presently preferred among these optional polymers are polyolefins such as polyethylenes, and more preferably high density polyethylenes (HDPE), in order to reduce brittleness of molded parts made from compounds of the present invention.

Optional Other Additives

The compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers, such as core/shell impact modifiers; processing aids; release agents; silanes, titanates and zirconates; slip and anti-blocking agents; stabilizers; stearates; ultraviolet light absorbers; viscosity regulators; waxes; catalyst deactivators, and combinations of them.

Optional Colorants

Of the optional other additives, colorants are useful to provide color to the thermoplastic compound. With the presence of both white zinc sulfide and black thermal black, the grayscale necessary in the establishment of a single location in color space is now possible.

Colorant can be a pigment, a dye, a combination of pigments, a combination of dyes, a combination of pigments and dye, a combination of pigment and dyes, or a combination of pigments and dyes. The choice of colorants depends on the ultimate color desired by the designer of the plastic article made from the compounds of the present invention. Pigments are preferred for durability to resist discoloration because of exposure to ultraviolet light.

The science of color is well known to those skilled in the art. Without undue experimentation, one can use color matching techniques to identify a particular location in spherical color space. For example, one skilled in the art can use the teachings of PCT Patent Application US2004/012233 to digitally map color space using specific polymer carriers and colorants as raw material ingredients. Alternatively, one can make small samples called plaques for visual review.

Colorants are commercially available from a number of sources well known to those skilled in the art. Commercially available pigments are well known to those skilled in the art and include organic and inorganic colorant chemistries. Commercially available dyes are well known to those skilled in the art and include all organic chemistries. Commercial sources for pigments and dyes include multinational companies such as BASF, Bayer, Ciba-Geigy, Color-Chem International, Sun Chemical, Zhuhai Skyhigh Chemicals, and others identified at Internet Web Sites such as http://www.colorpro.com/info/vendors/colorant.html and http://dir.yahoo.com/Business and Economy/Business to Business/Chemicals and Allied Products/Pigments and Dyes/

PolyOne Corporation provides a wide range of color concentrates (also called masterbatches) that can be used to make a standard color or a customized color in a compound to be extruded or molded into a plastic article, having thermal conductivity, a tailored amount of surface resistivity, and a specific color.

Ingredients

Table 1 shows the acceptable, desirable, and preferred amounts of each of the ingredients discussed above, recognizing that the optional ingredients need not be present at all. All amounts are expressed in weight percent of the total compound.

TABLE 1

| Range of Ingredients | | | |
|---|---|---|---|
| | Acceptable | Desirable | Preferable |
| Polymer Matrix | 5-45 | 10-40 | 15-35 |
| Zinc Sulfide | 30-80 | 50-75 | 60-70 |
| Optional Reinforcing Filler | 0-20 | 0-15 | 2-7 |
| Optional Other Polymer | 0-20 | 0-15 | 5-10 |
| Optional Other Additives | 0-10 | 0-7 | 1-5 |

Processing

The preparation of compounds of the present invention is uncomplicated. The compound of the present can be made in batch or continuous operations.

Mixing in a continuous process typically occurs in a single or twin screw extruder that is elevated to a temperature that is sufficient to melt the polymer matrix with addition of other ingredients either at the head of the extruder or downstream in the extruder. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a Banbury mixer that is capable of operating at a temperature that is sufficient to melt the polymer matrix to permit addition of the solid ingredient additives. The mixing speeds range from 60 to 1000 rpm and temperature of mixing can be ambient. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

USEFULNESS OF THE INVENTION

Compounds of the present invention can dissipate heat quite efficiently, making them suitable for extruded or molded articles designed to contact a heated object and conduct that heat away from that object or contact a heated object and conduct that heat toward a second object that needs heat also. Either way, the compounds of the present invention can transport heat away from that source, whether to distribute to a remote location from that object (a radiator in a residential room) or to dissipate to a remote location from that object (a heat sink).

The physical properties of the polymer matrix determines the suitability of the compound for specific polymer engineering purposes; the use of the ZnS imparts thermally conductive where none or only a little thermal conductivity previously existed in the polymer matrix.

Examples provide data for evaluation.

EXAMPLES

Table 2 shows the ingredients chosen for Examples 1 and 2 and Comparative Example A.

TABLE 2

Recipes and Sources

| Ingredient Name | Brand Name | Commercial Source | A | 1 | 2 |
|---|---|---|---|---|---|
| ZnS Powder | Sachtolith HD | Sachtleben | 0 | 65 | 65 |
| PPS | Ryton PR26 | Chevron Phillips | 95 | 22.5 | 30 |
| Fiberglass | Vetrotex 910 | St. Gobain | 5 | 5 | 5 |
| High Density Polyethylene | No. R21-281 | Solvay | 0 | 7.5 | 0 |

Table 3 shows the mixing conditions in a Prism 16 mm twin screw extruder.

TABLE 3

Extruder Conditions

|  | Set |
|---|---|
| All Zones (° C.) | 300 |
| Die (° C.) | 300 |
| RPM | 600 |

The extrudate was pelletized for later molding.

Using a 33 Cincinnati Millacron molding machine, the following settings were used to mold plaques and tensile test bars of the compound of the present invention.

TABLE 4

Molding Conditions

| Drying Conditions: | |
|---|---|
| Temperature | 100° C. |
| Time (h) | 3 |
| Temperatures: | |
| Nozzle (° F.) | 580 |
| Zone 1 (° F.) | 570 |
| Zone 2 (° F.) | 570 |
| Zone 3 (° F.) | 560 |
| Mold (° F.) | 200 |
| Oil Temp (° F.) | 100 |
| Speeds: | |
| Screw RPM | 65% |
| % Shot - Inj Vel Stg 1 | 10% |
| % Shot - Inj Vel Stg 2 | 25% |
| % Shot - Inj Vel Stg 3 | 20% |
| % Shot - Inj Vel Stg 4 | 25% |
| % Shot - Inj Vel Stg 5 | 10% |
| Pressures: | |
| Hold Stg 1 (PSI) - Time(sec) | 600 |
| Hold Stg 2 (PSI) - Time(sec) | 1200 |
| Timers: | |
| Injection Hold (sec) | 10 |
| Cooling Time (sec) | 30 |
| Operation Settings: | |
| Shot Size | 7.5 |
| Cushion | 0.3 |

Table 5 shows physical properties of the test plaques.

TABLE 5

| Physical Property (Average of 3 Samples, except for Thermal Conductivity) | Comparative A | 1 | 2 |
|---|---|---|---|
| Izod (ft./lb.) | 0.30 | 0.40 | 0.40 |
| Flexural Modulus (psi) | 639.3 | 1243.3 | 1573.3 |
| Tensile Modulus (ksi) | 626.7 | 1390.0 | 1596.7 |
| Stress at Break (psi) | 7043.3 | 6610.0 | 10,633.3 |
| Strain at Break % | 1.2 | 0.6 | 0.8 |
| Thermal Conductivity (Through Plane at 25° C.) (W/mK) |  | 1.052 | 1.070 |

Four more formulations, all without reinforcing fiber, were extruded, molded, and tested for physical properties under similar conditions as Comparative Example A and Examples 1 and 2. Table 6 shows the formulations and test results.

TABLE 6

| | Example | | | | |
|---|---|---|---|---|---|
| | 3 | 4 | 5 | 6 | 7 |
| ZnS (Sachtolith HD) | 65.000 | 65.000 | 65.000 | 65.000 | 65.000 |
| PPS (Ryton PR 26) | 35.000 | 30.625 | 26.250 | 30.625 | 26.250 |
| Fiberglass | 0.000 | 0.000 | 0.000 | 0.000 | 0.000 |
| HDPE (Solvay R21-281) | 0.000 | 4.375 | 8.750 | 0.000 | 0.000 |
| Impact Modifier (Arkema Lotader AX 8840 -- Ethylene/Glycidyl Methacrylate copolymer) | 0.000 | 0.000 | 0.000 | 4.375 | 8.750 |
| Izod (ft./lb.) | 0.60 | 0.50 | 0.40 | 0.73 | 0.77 |
| Flexural Modulus (psi) | 1193.3 | 1106.7 | 1036.7 | 830.3 | 577.7 |
| Tensile Modulus (ksi) | 1203.3 | 1196.7 | 1140.0 | 862.3 | 635.0 |
| Stress at Break (psi) | 8356.7 | 6856.7 | 7296.7 | 8006.7 | 6116.7 |
| Strain at Break % | 0.8 | 0.8 | 0.8 | 2.0 | 2.3 |

Examples 8-12 were prepared for a polyamide-based formulations, for both nylon 6 and nylon 6,6. Tables 7-10 show the formulations, conditions, and results.

TABLE 7

| Formulations | 8 | 9 | 10 | 11 | 12 |
|---|---|---|---|---|---|
| 650A natural 16 mesh pulverized nylon | 35 | 30 | 25 | | |
| nylon 6,6 | | | | 35 | 30 |
| ZnS (Sachtolith HDS) | 60 | 60 | 60 | 60 | 60 |
| Thermal carbon black (Arosperse 15) | 5 | 5 | 5 | 5 | 5 |
| Glass Fiber (Fiberglass 991) | | 5 | 10 | | 5 |
| TOTAL | 100 | 100 | 100 | 100 | 100 |

TABLE 8

| Extrusion Conditions | 8 | 9 | 10 | 11 | 12 |
|---|---|---|---|---|---|
| Zone 1 (° C.) | 230 | 230 | 230 | 230 | 230 |
| Zone 2 (° C.) | 230 | 230 | 230 | 230 | 230 |
| Zone 3 (° C.) | 230 | 230 | 230 | 230 | 230 |
| Zone 4 (° C.) | 230 | 230 | 230 | 230 | 230 |
| Zone 5 (° C.) | 240 | 240 | 240 | 240 | 240 |
| Zone 6 (° C.) | 240 | 240 | 240 | 240 | 240 |
| Zone 7 (° C.) | 245 | 245 | 245 | 245 | 245 |
| Zone 8 (° C.) | 250 | 250 | 250 | 250 | 250 |
| Zone 9 (° C.) | 250 | 250 | 250 | 250 | 250 |
| Die Temp (° C.) | 260 | 260 | 260 | 260 | 260 |
| RPM | 600 | 600 | 600 | 600 | 600 |
| % Torque | 83-87 | 80-92 | 87-93 | 85-99 | 85-99 |
| Feeder Rate (%) | 50 | 20 | 20 | 9 | 7 |
| Vacuum (in Hg vac) | 20 | 20 | 20 | 20 | 20 |

TABLE 9

| Molding Conditions for Tensile Test Bars | 8 | 9 | 10 | 11 | 12 |
|---|---|---|---|---|---|
| Drying Conditions: | | | | | |
| Temperature (° F.) | 190 | 190 | 190 | 190 | 190 |
| Time (h) | 4 | 4 | 4 | 4 | 4 |
| Temperatures: | | | | | |
| Zone 1 (Nozzle) (° F.) | 630 | 630 | 630 | 630 | 630 |
| Zone 2 (° F.) | 620 | 620 | 620 | 620 | 620 |
| Zone 3 (° F.) | 590 | 590 | 590 | 590 | 590 |
| Zone 4 (° F.) | 580 | 580 | 580 | 580 | 580 |
| Mold (° F.) | 250 | 250 | 250 | 250 | 250 |
| Oil Temp (° C.) | 75 | 75 | 75 | 75 | 75 |
| Speeds: | | | | | |
| Screw RPM | 65% | 65% | 65% | 65% | 65% |
| SM - Inj Vel 1 | 55% | 55% | 55% | 55% | 55% |
| S1 - Inj Vel 2 | 50% | 50% | 50% | 50% | 50% |
| S2 - Inj Vel 3 | 45% | 45% | 45% | 45% | 45% |
| S3 - Inj Vel 4 | 35% | 35% | 35% | 35% | 35% |
| S4 - Inj Vel 5 | 25% | 25% | 25% | 25% | 25% |
| Pressures: | | | | | |
| Inj Press Stg - Time (s) | | | | | |
| Injection Pressure 1 | 99% | 99% | 99% | 99% | 99% |
| Hold Pressure 2 | 18% | 20% | 18% | 18% | 18% |
| Hold Pressure 3 | 15% | 17% | 15% | 15% | 15% |
| Back Pressure | 5% | 5% | 5% | 5% | 5% |
| Timers: | | | | | |
| Injection Hold (s) | 8 | 8 | 8 | 8 | 8 |
| Cure Time (s) | 25 | 25 | 25 | 25 | 25 |
| Operation Settings: | | | | | |
| Shot Size (SM) | 56 | 56 | 56 | 56 | 56 |
| Cushion | 10.7 | 11 | 12 | 9.8 | 10.9 |
| Cut-Off Position | 18 | 18 | 18 | 18 | 18 |
| Cut-Off Pressure | 2000 | 2000 | 2000 | 2000 | 2000 |
| Cut-Off Time | 0.86 | 0.86 | 0.86 | 0.86 | 0.86 |
| Cut-Off Mode | POS | POS | POS | POS | POS |
| Decompression | 4 | 4 | 4 | 4 | 4 |

TABLE 10

| Physical Properties (English Units) of Tensile Test Bars | 8* | 9 | 10 | 11 | 12 |
|---|---|---|---|---|---|
| Notched Impact Izod (ASTM D-256) (ft-lb/in @ 23° C.) | 0.8 | 0.6 | 0.5 | 0.5 | 0.5 |
| Tensile Modulus (ASTM D-238) (kpsi @ 2.0 in/min) | 898 | 1186 | 1532 | 1101 | 1018 |
| Tensile Stress @ Break (ASTM D-238) (psi @ 2.0 in/min) | 9698 | 10720 | 9474 | 10706 | 10160 |
| Tensile Strain @ Break (ASTM D-238) (% @ 2.0 in/min) | 1.4 | 1.1 | 0.9 | 1.1 | 1.2 |
| Flex Modulus (ASTM D-790) (kpsi @ 0.5 in/min) | 820 | 1004 | 1354 | 969 | 915 |
| Flex Stress at Yield (ASTM D-790) (kpsi @ 0.5 in/min) | 15138 | 15204 | 16132 | 14950 | 14573 |
| Flex Strain at Yield (ASTM D-790) (in/in @ 0.5 in/min) | 2.2 | 1.7 | 1.3 | 1.8 | 1.7 |
| Heat Capacity* (J/g ° C.) | 0.909 0.897 | 0.915 | 0.830 | 0.893 | 0.836 |
| Diffusivity* (mm²/s) | 0.518 0.515 | 0.451 | 0.584 | 0.484 | 0.490 |
| Through Plane Thermal Conductivity* (W/mK) | 0.994 0.976 | 1.055 | 1.140 | 0.913 | 0.912 |

*Two samples of Example 8 were measured.

For the Thermal Conductivity testing, the samples were spray coated with dgf123 graphite and tested in a Netzsch Nanoflash LFA 447 instrument, conforming to ASTM D1461-01. The experimental parameters used to collect the data were: Temperature: 25° C., Filter: 100, Pulse: medium, and Pre-amp and amp: 10×5002 tt. After measuring Heat Capacity and Diffusivity, the Thermal Conductivity was calculated according to the following equation:

$$K = \rho * Cp * \alpha$$

where: $\rho$ is density (g/cm³); Cp is heat capacity (J/g C); and $\alpha$ is diffusivity (mm²/s).

The invention is not limited to the above embodiments. The claims follow.

What is claimed is:

1. A thermally conductive polymer compound, comprising a polyamide and zinc sulfide and particles of thermal carbon black dispersed in the matrix,
    wherein the zinc sulfide is present in an amount ranging from about 30 to about 80 by weight percent of the compound,
    wherein the particles of thermal carbon black are 100-500 nm in diameter, and
    wherein an increasing weight percent of thermal carbon black particles increases electrical conductivity of the compound.

2. The compound of claim 1, further comprising reinforcing filler.

3. The compound of claim 2, wherein the polymer matrix is nylon 6 and wherein the filler is glass fiber.

4. The compound of claim 2, wherein the polymer matrix is nylon 6,6 and wherein the filler is glass fiber.

5. The compound of claim 1, further comprising glass fiber.

6. The compound of claim 1, further comprising one or more colorants, that when present with zinc sulfide which is white and thermal carbon black which is black can cause the compound to be any color in spherical color space.

7. The compound of claim 6, wherein the colorant comprises a pigment, a dye, a combination of pigments, a combination of dyes, a combination of pigments and dye, a combination of pigment and dyes, or a combination of pigments and dyes.

8. The compound of claim 5, further comprising one or more colorants, that when present with zinc sulfide which is white and thermal carbon black which is black can cause the compound to be any color in spherical color space.

9. The compound of claim 8, wherein the colorant comprises a pigment, a dye, a combination of pigments, a combination of dyes, a combination of pigments and dye, a combination of pigment and dyes, or a combination of pigments and dyes.

10. The compound of claim 1, further comprising a polymeric impact modifier.

11. A method of using the compound of claim 1, wherein the compound is extruded or molded into an article designed to contact a heated object and conduct that heat away from that object or contact a heated object and conduct that heat toward a second object that needs heat also.

12. The method of claim 11, wherein the compound further comprises reinforcing filler.

13. A thermally conductive extruded or molded article made from the compound of claim 1.

14. The article of claim 13, wherein the compound further comprises reinforcing filler.

15. The article of claim 13, wherein the compound further comprises colorant.

* * * * *